United States Patent
Nishikata et al.

(10) Patent No.: US 9,642,132 B2
(45) Date of Patent: May 2, 2017

(54) COMMUNICATION DEVICE AND COMMUNICATION METHOD

(71) Applicant: FUJITSU LIMITED, Kawasaki-shi (JP)

(72) Inventors: Yosuke Nishikata, Tokyo (JP); Yoshihiko Shirokura, Tokyo (JP); Naoto Miyauchi, Tokyo (JP); Masahiro Machida, Tokyo (JP); Yukio Hayashi, Tokyo (JP); Tetsuhiro Murata, Tokyo (JP); Yasuaki Kamimura, Tokyo (JP); Hiroaki Tamai, Kawasaki (JP); Takafumi Kawakami, Nakano (JP); Kazuya Takeuchi, Mitaka (JP)

(73) Assignee: FUJITSU LIMITED, Kawasaki (JP)

( * ) Notice: Subject to any disclaimer, the term of this patent is extended or adjusted under 35 U.S.C. 154(b) by 158 days.

(21) Appl. No.: 14/479,691

(22) Filed: Sep. 8, 2014

(65) Prior Publication Data
US 2014/0376526 A1 Dec. 25, 2014

Related U.S. Application Data

(63) Continuation of application No. PCT/JP2013/055851, filed on Mar. 4, 2013.

(30) Foreign Application Priority Data

Mar. 9, 2012 (JP) .................................. 2012-053832

(51) Int. Cl.
*H04W 72/04* (2009.01)
*H04W 56/00* (2009.01)
(Continued)

(52) U.S. Cl.
CPC ........ *H04W 72/0446* (2013.01); *G08C 15/06* (2013.01); *H04L 67/12* (2013.01);
(Continued)

(58) Field of Classification Search
None
See application file for complete search history.

(56) References Cited

U.S. PATENT DOCUMENTS 5,896,097 A * 4/1999 Cardozo ................ G08C 15/06
340/10.2
2008/0068994 A1* 3/2008 Garrison Stuber .... G01D 4/004
370/230

FOREIGN PATENT DOCUMENTS

JP 3288162 6/2002
JP 2009-188929 8/2009

OTHER PUBLICATIONS

International Search Report mailed Apr. 9, 2013 in corresponding application PCT/JP2013/055851.

* cited by examiner

*Primary Examiner* — Hicham Foud
(74) *Attorney, Agent, or Firm* — Staas & Halsey LLP

(57) ABSTRACT

A communication device is provided in a wireless multi-hop network. The communication device receives a sequence number, a divided time acquired by dividing a time width allocated for transmitting detected usage data by a division number, and the division number. The communication device calculates a remainder by dividing the received sequence number by the division number and calculates a transmission offset time based on the remainder and the divided time. The communication device transmits the usage data based on the calculated transmission offset time.

7 Claims, 3 Drawing Sheets

(51) Int. Cl.
*G08C 15/06* (2006.01)
*H04W 84/18* (2009.01)
*H04L 29/08* (2006.01)

(52) U.S. Cl.
CPC ........ *H04W 56/00* (2013.01); *H04Q 2209/60* (2013.01); *H04W 84/18* (2013.01)

| INFORMATION TABLE | |
|---|---|
| 21 — TRANSMISSION INTERVAL Ta | AB SEC |
| 22 — TRANSMISSION INTERVAL Tb | C SEC |
| 23 — DIVISION NUMBER | D |
| 24 — SEQUENCE NUMBER | E |
| 25 — TIME-SYNCHRONIZATION ERROR MARGIN | F SEC |
| 26 — TRANSFER-TIME MARGIN | G SEC |
| 27 — MAC ADDRESS | HI:JK:LM:NO |
| 28 — METER-READING TIME | P MIN, Q MIN |
| 29 — TRANSMISSION START TIME | R SEC |
| 30 — TRANSMISSION END TIME | S SEC |

COMMUNICATION DEVICE AND COMMUNICATION METHOD

CROSS-REFERENCE TO RELATED APPLICATION(S)

This application is a continuation of International Application No. PCT/JP2013/055851, filed on Mar. 4, 2013 which claims the benefit of priority of the prior Japanese Patent Application No. 2012-053832, filed on Mar. 9, 2012.

FIELD

The embodiments discussed herein are related to a communication device and a communication method for transmitting and receiving data in a wireless multi-hop network.

BACKGROUND

Technologies of transmitting the data of electric power usage have been known. With the technologies, a plurality of nodes capable of communicating wirelessly measure the electric power usage and transmit the data of the electric power usage to a gateway by a multi-hop communication through the nodes (Japanese Laid-open Patent Publication No. 2009-188929, for example). In Japanese Laid-open Patent Publication No. 2009-188929, all of the nodes in the system measure the electric power usage at a particular clock time and transmit the measured value to a gateway through relay nodes. The gateway collects the electric power usage data and transmits the data to a collection server. The collection server then uses the collected electric power usage data. In the communication system disclosed in Japanese Laid-open Patent Publication No. 2009-188929, the nodes, the gateway, and the collection server have a synchronized clock time. The nodes measure the electric power usage at a certain clock time and transmit the measured value of the electric power usage to the collection server.

In wireless communication, if a plurality of communications are performed at the same time on the same channel, collisions are generated and thus communications are unavailable in some communication methods. To cope with this, conventional technologies have been known in which the timing of communicating by the nodes is determined by the remainder acquired by dividing the value unique to the device of each of the nodes by a fixed value, for the purpose of distributing the timing of communicating by the nodes (Japanese Patent No. 3288162, for example).

In the communication system disclosed in Japanese Laid-open Patent Publication No. 2009-188929, the nodes transmit the electric power usage data to the gateway at a certain clock time. If a wireless communication system with a low transmission rate is used, the possibility of collisions during the wireless communications increases. This may reduce the collectability of the data. In an ad hoc network, in particular, the nodes indirectly communicate with the gateway through a plurality of nodes. If the nodes communicate with the gateway, therefore, the possibility of signal collisions on the wireless network increases according to the number of hops in addition to the number of nodes counted from a first-transmitting node to the gateway.

With the method disclosed in Japanese Patent No. 3288162, distributing the times of communications is determined by the remainder acquired by dividing the value unique to the device of each of the nodes by a fixed value. The unique value is, however, determined when the nodes are provided in the network, which can be hardly changed once the nodes are provided. The timing of transmitting the electric power usage data by the nodes can therefore not be controlled.

SUMMARY

According to an aspect of an embodiment, a communication device is provided in a wireless multi-hop network. The communication device includes a receiving unit, a transmission-offset calculating unit, and a transmitting unit. The receiving unit is configured to receive a sequence number, a divided time acquired by dividing a time width allocated for transmitting detected usage data by a division number, and the division number. The transmission-offset calculating unit is configured to calculate a remainder by dividing the sequence number received by the receiving unit by the division number and calculates a transmission offset time based on the remainder and the divided time. The transmitting unit is configured to transmit the usage data based on the transmission offset time calculated by the transmission-offset calculating unit.

According to another aspect of an embodiment, a communication device is provided in a wireless multi-hop network. The communication device includes a receiving unit, a transmission-offset calculating unit, and a transmitting unit. The receiving unit is configured to receive a sequence number, a divided time acquired by dividing a time width allocated for transmitting self-detected usage data by a division number, the division number, and a predetermined time period shorter than the divided time. The transmission-offset calculating unit is configured to calculate a quotient and a remainder by dividing the sequence number received by the receiving unit by the division number and calculates a transmission offset time based on the product of the remainder and the divided time and on the product of the quotient and the predetermined time period. The transmitting unit is configured to transmit the usage data based on the transmission offset time calculated by the transmission-offset calculating unit.

According to still another aspect of an embodiment, a communication method executed by a communication device provided in a wireless multi-hop network, the communication method includes: receiving a sequence number, a divided time acquired by dividing a time width allocated for transmitting detected usage data by a division number, and the division number; calculating a remainder by dividing the sequence number received at the receiving by the division number and calculating a transmission offset time based on the remainder and the divided time; and transmitting the usage data based on the transmission offset time calculated at the calculating.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. However, the embodiments herein are not intended to limit the scope of the invention.

[a] First Embodiment

The following describes a first embodiment of a communication device according to the present invention in detail with reference to FIGS. 1 through 5.

Figure 1:
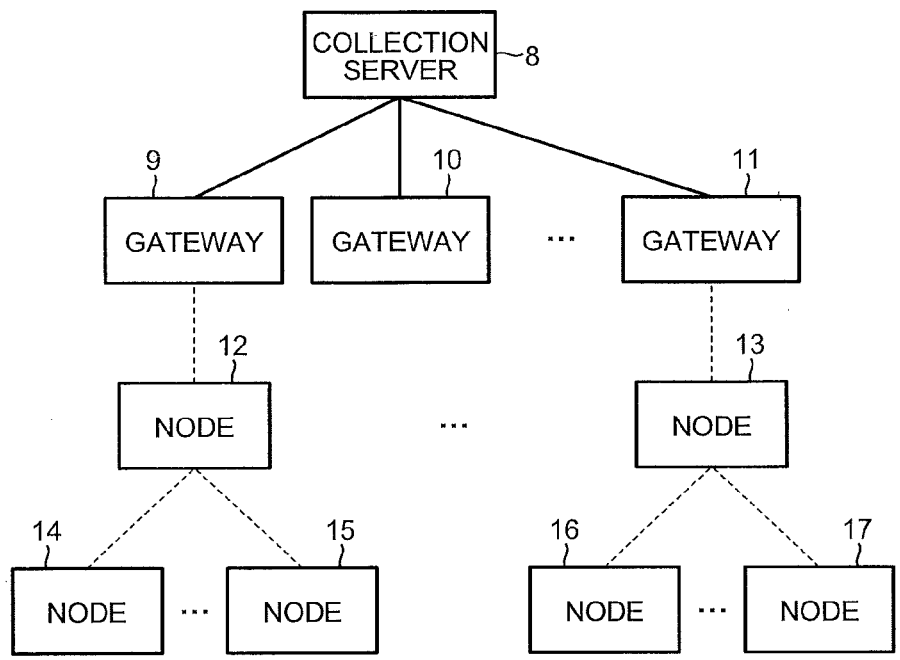
FIG. 1 is a block diagram illustrating an overall configuration of a wireless multi-hop network according to an embodiment of the present invention.

FIG. 1 is a block diagram illustrating the overall configuration of a wireless multi-hop network according to the first embodiment of the present invention. The wireless multi-hop network includes a collection server 8, gateways 9, 10, and 11, and communication devices (hereinafter nodes) 12 to 17. The collection server 8 is, for example, installed in electric utilities. The gateways 9, 10, and 11 are coupled to the collection server 8 through a network such as a mobile telephone network and an optical line. The nodes are coupled to the gateways and the nodes and gateways communicate wirelessly with each other.

The nodes 12 to 17 are installed, for example, in homes and factories and periodically measures the electric power usage. The nodes 12 to 17 are housed in the gateways 9 to 11. The nodes 12 to 17 each maintain information on an uplink path. The uplink path represents which of the nodes 12 to 17 to be used as a relay when any of the nodes 12 to 17 transmits data to a particular one of the gateways 9 to 11 in which the node is housed. The nodes 12 to 17 each transmit data received from another one of the nodes 12 to 17 to a particular one of the nodes 12 to 17 serving as a relay to an intended one of the gateways 9 to 11. This enables the nodes 12 to 17 to transmit the data to the gateways 9 to 11. In this example, a node measures the electric power usage. However, this is merely an example and not limiting. A measuring unit may be provided separately and a node may retrieve data of the electric power usage from the measuring unit.

The description is provided herein on the electric power usage data. However the electric power usage data is merely an example and not limiting. Various types of data such as data of gas usage or water usage may be also used.

The gateways 9 to 11 transmit the electric power usage data received from the nodes 12 to 17 to the collection server 8. The gateways 9 to 11 also transmit control signals of the network to the corresponding nodes 12 to 17 housed in the gateways 9 to 11. The gateways 9 to 11 also transfer control signals transmitted by the collection server 8 to the corresponding nodes 12 to 17 housed in the gateways 9 to 11.

The collection server 8 collects the data transmitted by the gateways 9 to 11. This enables electric utilities to deploy various services using data on time transition of the electric power usage acquired from the nodes 12 to 17. Deploying services of electric utilities is provided merely for exemplary purpose and not limiting. Various types of data collection application services may be used such as services of gas companies and water suppliers.

The collection server 8 is installed in the data center of electric utilities. The collection server 8 collects data of the electric power usage for each of the nodes 12 to 17 through the gateways 9 to 11. The collection server 8 maintains node housing information for the purpose of transmitting a downlink signal to a node. The node housing information represents which of the nodes 12 to 17 is housed in which of the gateways 9 to 11. The collection server 8 has the following functions: the function of registering the gateways 9 to 11; the function of permitting the nodes 12 to 17 to join the network and registering the nodes 12 to 17; and the function of supplying the clock time to the gateways 9 to 11 and the nodes 12 to 17. Alternatively, the function of supplying the clock time may be achieved by providing a separate time server to supply the clock time to the collection server 8 and the gateways 9 to 11.

For example, the collection server 8 maintains the clock time in the following manner: the collection server 8 have the clock time synchronized with the gateways 9 to 11 thereunder using a network time protocol (NTP). The gateways 9 to 11 and the nodes 12 to 17 sequentially transfer time synchronization signals including time synchronization information to the respective neighboring gateways and nodes, whereby the clock time of the gateways 9 to 11 and the clock time of the nodes 12 to 17 are synchronized with each other.

All of the nodes 12 to 17 transmit the electric power usage data periodically to the collection server 8 based on the clock time supplied from the collection server 8. The data collected by the collection server 8 is used for a service of charge calculation, for example.

In addition to the electric power usage data, control signals used for managing the network are transmitted and received on the network. Examples of the control signal include the following: an active-monitoring signal for checking whether a line is active between the nodes 12 to 17; a gateway information notifying signal transmitted from the gateways 9 to 11 to the nodes 12 to 17; a registration signal transmitted if the nodes 12 to 17 join the configured network; and a software information signal used for updating the firmware.

Figure 2:
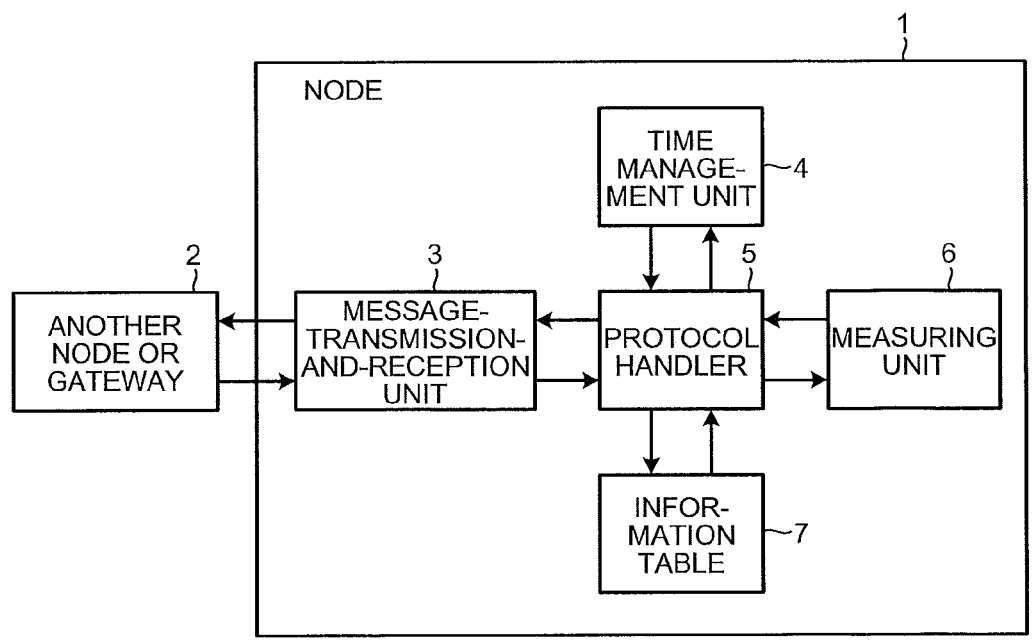
FIG. 2 is a block diagram illustrating an example of a configuration of a node used in the wireless multi-hop network according to the embodiment.

FIG. 2 is a block diagram illustrating the configuration of a node 1 used in a wireless multi-hop network. The nodes 12 to 17 illustrated in FIG. 1 each have the same function as the node 1 illustrated in FIG. 2. The node 1 includes a message-transmission-and-reception unit 3 having a receiving unit (not illustrated) and a transmitting unit (not illustrated), a time management unit 4 a protocol handler 5, a measuring unit 6, and an information table 7. The receiving unit receives a message wirelessly transmitted from another node or a gateway 2. The transmitting unit transmits a message to another node or the gateway 2. The time management unit 4 maintains the present clock time and has a timer function. The protocol handler 5 performs control according to the received message and the measuring unit 6 measures the electric power usage. The information table 7 maintains various types of information therein.

The following describes the configuration of the functional blocks illustrated in FIG. 2. The message-transmission-and-reception unit 3 includes an antenna and a radio frequency integrated circuit (RFIC), for example. The message-transmission-and-reception unit 3 receives data through a wireless communication and outputs the received data to the protocol handler 5. The message-transmissionand-reception unit 3 also transmits reversely the data input from the protocol handler 5 to another node or gateway 2.

The time management unit 4 maintains the clock time notified by the protocol handler 5 and also periodically refers to the clock time maintained by the protocol handler 5. The time management unit 4 is typically, for example, a timer or a clock integrated circuit (IC) included in a central processing unit (CPU).

The protocol handler 5 includes a CPU, a read only memory (ROM) that stores therein a control program, and a random access memory (RAM) used for the CPU to execute an operation program. The protocol handler 5 executes a control program in which the operations of the protocol handler 5 are described, using the CPU and the RAM, thereby controlling the node of the protocol handler 5. The protocol handler 5 performs the following control: control of the transmitted and received data between the message-transmission-and-reception unit 3 and itself; control of setting process of a clock time and a timer between the time management unit 4 and itself; control of measurement process of the electric power usage between the measuring unit 6 and itself; and control of setting process and referring process of values in the information table 7.

The measuring unit 6 measures the electric power usage according to an instruction by the protocol handler 5 and returns the measured value to the protocol handler 5. This is typically executed by an electric energy meter (not illustrated). Although the measuring unit 6 includes an electric energy meter in the embodiment, this is provided merely for exemplary purpose and not limiting. A measuring unit according to the embodiment of the present invention may be applied to other types of meters such as a thermometer and may be used for various purposes in addition to measuring electric power usage.

The information table 7 is a storage section included in storage media such as a ROM and a RAM.

Figures 3, 4:
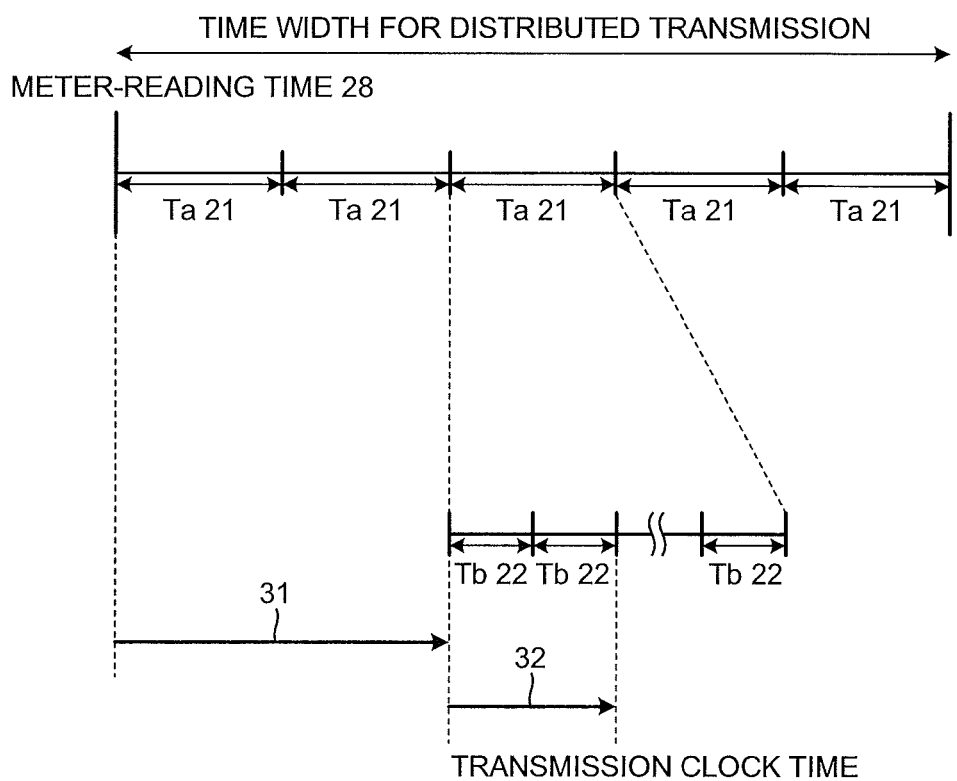
FIG. 3 is a view illustrating information elements included in an information table included in a node according to the embodiment.
FIG. 4 is a diagram illustrating timing of message transmission when a node performs distributed transmission according to the embodiment.

FIG. 3 is a view illustrating information elements included in an information table included in the nodes. The following describes the information maintained in the information table in detail with reference to FIG. 3. The information is divided into three sections. First section information is information notified by a later-described gateway broadcasting signal from the gateway 9. The first section information includes a transmission interval (a divided time) Ta 21, a transmission interval (a particle size time) Tb 22, and a division number 23. The transmission interval (the divided time) Ta 21 is acquired by dividing a predetermined time width by the division number 23. The time width is a duration when a node performs distributed transmission of the electric power usage data. The transmission interval (the particle size time) Tb 22 is determined in advance, which is shorter than the transmission interval Ta 21. The transmission interval Ta 21, the transmission interval Tb 22, and the division number 23 are periodically transmitted by broadcast as information elements of the gateway broadcasting signal from the gateways 9 to 11. The nodes relay the gateway broadcasting signals to the nodes thereunder and transmit them by broadcasting, whereby the first section information is transferred throughout the network.

Upon receiving the gateway broadcasting signal, the protocol handler 5 updates the corresponding values of the first section information in the information table 7. If no gateway broadcasting signal has been received, the first section information represents the initial values maintained in the information table 7 in advance.

The second section information includes a sequence number 24 created and transmitted by the collection server 8, and included in a later-described terminal registration reply signal received through the gateways 9 to 11 or other nodes 12 to 17. The value of the sequence number 24 is determined by the collection server 8, which varies depending on the nodes 12 to 17. Upon receiving the gateway broadcasting signal, the protocol handler 5 updates the corresponding values of the first section information in the information table 7. If no gateway broadcasting signal has been received, the second section information represents the initial value maintained in the information table 7 in advance. The second section information may include a later-described time-synchronization error margin 25 and a later-described transfer-time margin 26.

The third section information is maintained in the nodes in advance and includes a MAC address 27 and a meter-reading time 28. The MAC address 27 is a unique value to a node that varies depending on the nodes 12 to 17. The value of the meter-reading time 28 is common to the nodes 12 to 17. The value of the meter-reading time 28 represents, for example, "0 and 30 minutes every hour" if a meter is read every half hour. The third section information may include a transmission start time 29 and a transmission end time 30 described later.

The protocol handler 5 refers to the clock time supplied from the time management unit 4, thereby enabling the measuring unit 6 to measure the electric power usage at the determined meter-reading time 28. The protocol handler 5 transmits the measured value of the electric power usage to the nodes 12 to 17 or the gateways 9 to 11 included in the route to the collection server 8 using a later-described method with distributed transmission times.

FIG. 4 is a diagram illustrating timing of message transmission when a node performs distributed transmission. The following describes a method of the distributed transmission performed by the protocol handler 5 in detail with reference to FIG. 4. The protocol handler 5 transmits the value of the electric power usage measured by the measuring unit 6 at the meter-reading time 28. The protocol handler 5 transmits the value at the clock time acquired by the calculation "the meter-reading time 28+a transmission offset time". The transmission offset time is a time to shift the timing of transmitting the electric power usage value from each of the nodes 12 to 17 to distribute the timings of transmitting the electric power usage values in the network. The transmission offset time is calculated as follows using the quotient and the remainder acquired by dividing the sequence number 24 by the division number 23: the transmission offset time=the transmission interval Ta 21\*the remainder+the transmission interval Tb 22\*the quotient.

With reference to FIG. 4, the transmission interval Ta 21\*the remainder corresponds to first time 31 and the transmission interval Tb 22\*quotient corresponds to second time 32.

The transmission offset time is acquired by the calculation "the transmission interval Ta 21\*the remainder+the transmission interval Tb 22\*the quotient". This is provided merely for exemplary purpose and not limiting. The transmission offset time may be acquired by the following simple calculation "the transmission interval Ta 21\*the remainder", thereby reducing the amount of calculation of the node.

The transmission offset time achieves the distributed transmission of the electric power usage data. The collection server 8 is capable of changing the sequence number 24 that can be set on the nodes 12 to 17, thereby controlling the transmission offset time.

The protocol handler 5 may calculate the transmission offset time by adding the time-synchronization error margin 25 as a margin taking into account the time-synchronization error and the transfer delay of the data.

Figure 5:
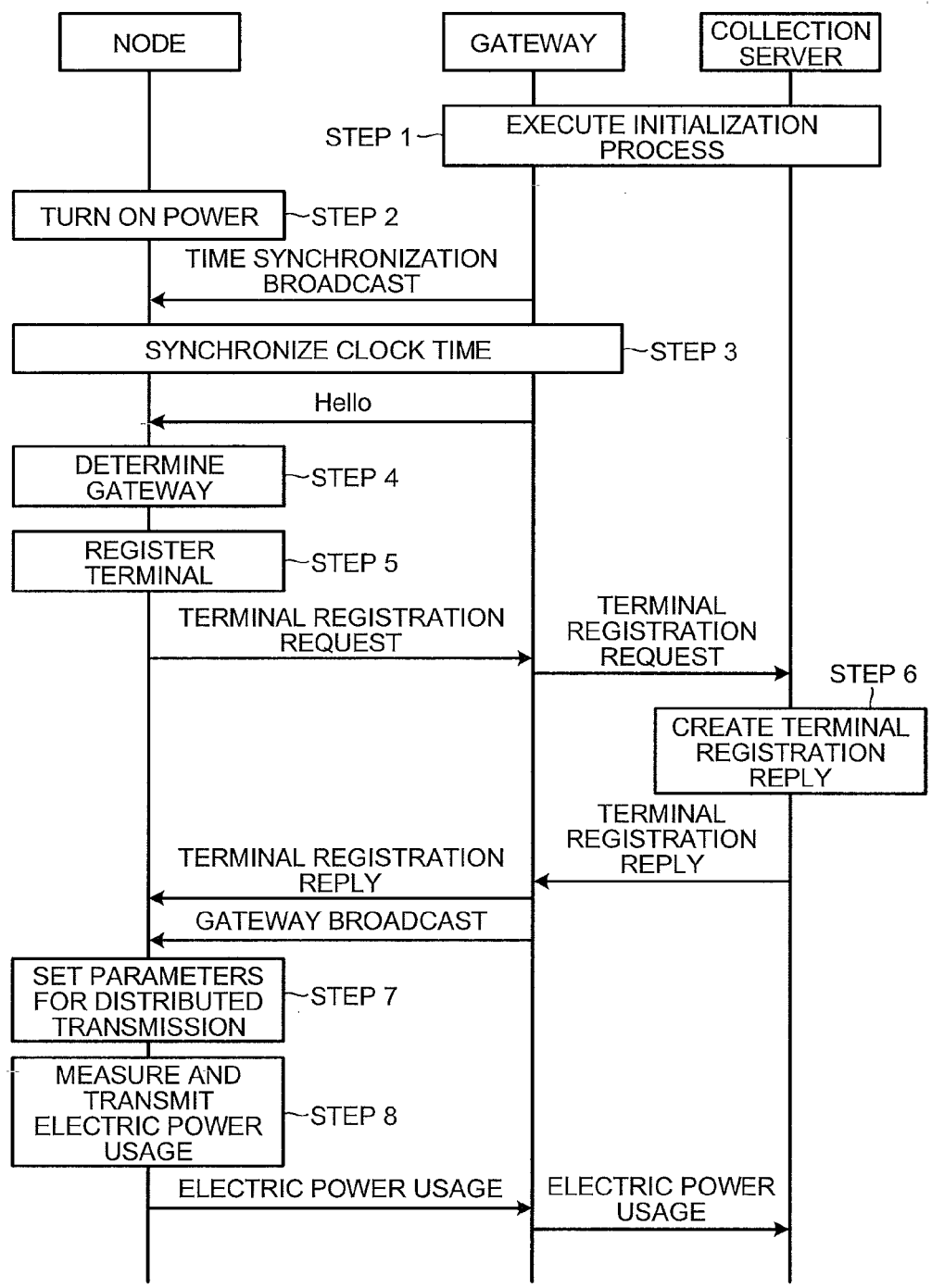
FIG. 5 is a sequence diagram illustrating the relation of message-transmission-and-reception between a node, a gateway, and a collection server according to the embodiment.

FIG. 5 is a sequence diagram illustrating the relation of message-transmission-and-reception between the node, the gateway, and the collection server. The following describes the operations step by step in the embodiment of the present invention with reference to FIG. 5. FIG. 1 illustrates the gateways 9, 10, and 11, out of which the gateway 9 is described below. The gateways 10 and 11 perform the same operations as the gateway 9.

At Step 1, the collection server 8 and the gateway 9, which have been coupled to each other through the network, exchange their IDs, synchronize the clock time, and execute an initialization process.

At Step 2, if either the node 12, 14 or 15 is not powered on, turning on the power of the node enables the message-transmission-and-reception unit 3, the time management unit 4, the protocol handler 5, the measuring unit 6, and the information table 7 to start up, whereby the following operations at Step 3 or later are available.

At Step 3, the powered-on nodes 12, 14, and 15 synchronize the clock time between their neighboring nodes and themselves. In the example illustrated in FIG. 5, the gateways synchronize the clock time on behalf of the neighboring node. The synchronization makes the clock time maintained in the time management unit 4 of the nodes 12, 14, and 15 synchronized with the clock time of the network.

At Step 4, the nodes 12, 14, and 15 receive hello signals transmitted by their peripheral nodes. The nodes 12, 14, and 15 select the gateway 9 in which they are housed based on the information included in the received hello signals. If the hello signal including information of a different gateway is received, the nodes 12, 14, and 15 select the corresponding gateway based on the information such as the number of hops and the received radio wave intensity of the hello signals.

At Step 5, the nodes 12, 14, and 15 transmit a terminal registration request signal to the collection server 8 through the gateway 9. The terminal registration request signal is a signal to request for joining the network. The terminal registration request signal includes at least the information of the MAC address 27 of the nodes 12, 14, and 15 and the information of the gateway that is housed therein.

At Step 6, the collection server 8 transmits a terminal registration reply signal as a response to the terminal registration request signal. The terminal registration reply signal includes the sequence number 24. The collection server 8 allocates a sequence number to each node based on the detailed information of the terminal registration request signal. The collection server 8 sets the value of the sequence number 24 to the node, thereby controlling the transmission offset time of the node.

For example, at recovery from a local blackout, a plurality of terminal registration request signals are converged from the nodes 12 to 17, leading to depletion of wireless resources, which may hinder the transfer of the electric power usage data by other usually operating nodes. To cope with this, at the recovery from a blackout, the timing of transmitting the terminal registration request signal may be delayed by an offset time acquired from the MAC address 27 (information unique to the device) maintained by the nodes 12 to 17, thereby ensuring that the electric power data of other usually operating nodes reaches the destination.

At Step 7, the nodes 12, 14, and 15 are notified of the transmission interval Ta 21, the transmission interval Tb 22, and the division number 23 by the gateway 9 using the gateway broadcasting signal. If the notified value is different from the value included in the information table 7, the original information table 7 is rewritten with the received information.

At Step 8, the nodes 12, 14, and 15 measure the electric power usage at the meter-reading time 28 and transmit the electric power usage data at the clock time determined by the calculation "the meter-reading time 28+the transmission offset time". The transmission offset time is calculated as follows using the quotient and the remainder acquired by dividing the sequence number 24 by the division number 23: the transmission offset time=the transmission interval Ta 21*the remainder+the transmission interval Tb 22*the quotient. This achieves the distributed transmission of the electric power usage data.

[b] Second Embodiment

The following describes a second embodiment of the communication device according to the present invention in detail. Only differences from the first embodiment are described and the descriptions common to the first embodiment are omitted.

The protocol handler 5 according to the second embodiment includes a control signal transmission canceller (not illustrated). The protocol handler 5 acquires a predetermined transmission start time 29 that is the clock time of starting transmission of the electric power usage data; and a predetermined transmission end time 30 that is the clock time of ending transmission of the electric power usage data as the information elements of the gateway broadcasting signal. The control signal transmission canceller transmits the measured value of the electric power usage using the time period from the transmission start time 29 to the transmission end time 30 as the transmission time of the electric power usage data. During this time, control signals with low priority are cancelled. Alternatively, the transmission start time 29 may be the meter-reading time 28, and the transmission end time 30 may be the time period until the product of the divided time and the division number elapses from the meter-reading time, whereby the transmission time of the electric power usage data may be calculated.

The transmission start time 29 and the transmission end time 30 may be included in the information table 7 (refer to FIG. 3). The transmission start time 29 and the transmission end time 30 may be changed by a message from the collection server 8 or may have fixed values.

In the above-described configuration, the timing of transmission of the measured value of the electric power usage is distinguished from the timing of transmission of other control signals. Therefore, wireless resources that are available for the transmission of the measured value of the electric power usage can be increased during the time period for transmitting the measured value of the electric power usage; and the collision of the signals related to the measured value of the electric power usage can be suppressed.

[c] Third Embodiment

The following describes a third embodiment of the communication device according to the present invention in detail. Only differences from the first embodiment are described and the descriptions common to the first embodiment are omitted.

Step 4 illustrated in FIG. 5 according to the first embodiment is substituted with a Step 4-1 (not illustrated) in the third embodiment.

At Step 4-1, if the node is restarted after transmitting the terminal registration request signal, the node does not transmit the terminal registration request signal again, and instead, the node utilizes previously-used information which is notified by the terminal registration reply signal.

With the above-described configuration, transmission of a redundant terminal registration request signal is eliminated, thereby reducing the possibility of the signal collisions during transmission of other messages.

[d] Fourth Embodiment

The following describes a fourth embodiment of the communication device according to the present invention in detail. Only differences from the first embodiment are described and the descriptions common to the first embodiment are omitted.

Although the nodes 12 to 17 are housed in a single gateway in the first embodiment, the gateway has a redundant configuration in the present embodiment. Step 3 illustrated in FIG. 5 is substituted with a Step 3-1 (not illustrated) in the fourth embodiment, and Step 4 illustrated in FIG. 5 is substituted with a later-described Step 4-2 (not illustrated).

At Step 3-1, the nodes 12 to 17 receives the hello signals transmitted by their peripheral nodes. The nodes 12 to 17 stand by other hello signals for one minute after receiving the hello signals. The nodes 12 to 17 select two gateways in which they are housed out of the gateways 9 to 11 based on the gateway information included in the hello signals received in the time period. One of the selected gateways is the main system and the other is the redundant system. The nodes 12 to 17 transmit the data to the collection server 8 through the main selected gateway system. A time period of one minute for standing by a hello signal is provided merely for exemplary purpose and not limiting.

At Step 4-2, the nodes 12 to 17 transmit the terminal registration request signals including the information of both the main gateway system and the redundant gateway system to the collection server 8.

With the above-described configuration, even when a redundant gateway is set, the number of times of transmitting the terminal registration request signals can be reduced. Consequently, the number of times the terminal registration reply signals are generated can be reduced.

According to one aspect of an embodiment, the communication device calculates a remainder by dividing a sequence number by a division number. A transmission offset time is then acquired based on the remainder and a divided time, thereby achieving distribution of the data transmission. The distribution provides the advantageous effect of reducing the possibility of data collisions. If the sequence number is changed, the transmission offset time can be changed, thereby achieving further distribution of the data transmission.

In addition, the communication device includes a control signal transmission canceller that cancels a network control signal with low priority during the transmission time of the electric power usage data. Hence, the wireless resources can be secured for the transmission of the electric power usage data.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication device provided in a wireless multi-hop network, the communication device comprising:
a memory; and
a processor coupled to the memory, the processor configured to execute a process including:
receiving a sequence number, a divided time acquired by dividing a time width allocated for transmitting detected usage data by a division number, and the division number;
calculating a remainder by dividing the received sequence number by the division number and calculating a transmission offset time based on the remainder and the divided time; and
transmitting the detected usage data based on the calculated transmission offset time.

2. The communication device according to claim 1, the process further including cancelling transmission of a control signal until the time width allocated to the communication device for transmitting the detected usage data elapses from a meter-reading time.

3. The communication device according to claim 1, wherein the detected usage data is data on power consumption.

4. A communication device provided in a wireless multi-hop network, the communication device comprising:
a memory; and
a processor coupled to the memory, the processor configured to execute a process including:
receiving a sequence number, a divided time acquired by dividing a time width allocated for transmitting detected usage data by a division number, the division number, and a predetermined time period shorter than the divided time;
calculating a quotient and a remainder by dividing the received sequence number by the division number and calculating a transmission offset time based on the product of the remainder and the divided time and on the product of the quotient and the predetermined time period; and
transmitting the detected usage data based on the calculated transmission offset time.

5. The communication device according to claim 4 the process further including cancelling transmission of a control signal until the time width allocated to the communication device for transmitting the detected usage data elapses from a meter-reading time.

6. The communication device according to claim 4, wherein the detected usage data is data on power consumption.

7. A communication method executed by a communication device provided in a wireless multi-hop network, the communication method comprising:
receiving a sequence number, a divided time acquired by dividing a time width allocated for transmitting detected usage data by a division number, and the division number;
calculating a remainder by dividing the sequence number received at the receiving by the division number and calculating a transmission offset time based on the remainder and the divided time; and
transmitting the usage data based on the transmission offset time calculated at the calculating.

* * * * *